Sept. 11, 1923.
P. VINDING ET AL
WING FOR WINDMILLS AND WIND MOTORS
Filed June 25, 1919
1,467,699
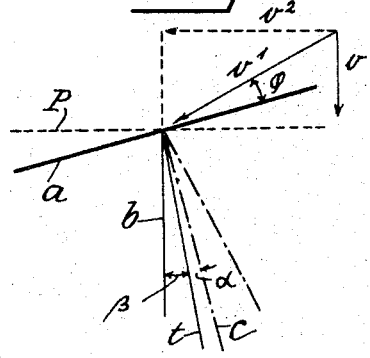
Fig. 1.
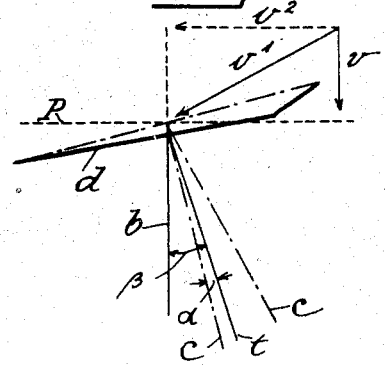
Fig. 2.
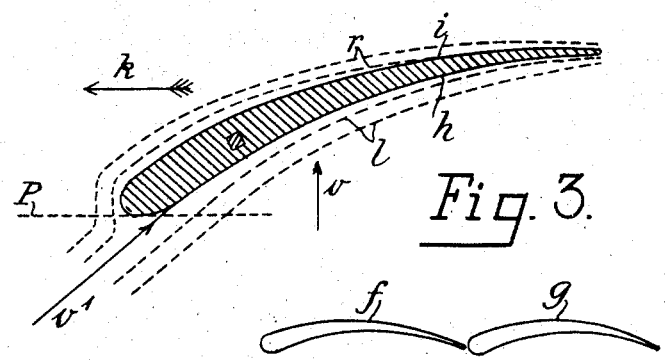
Fig. 3.
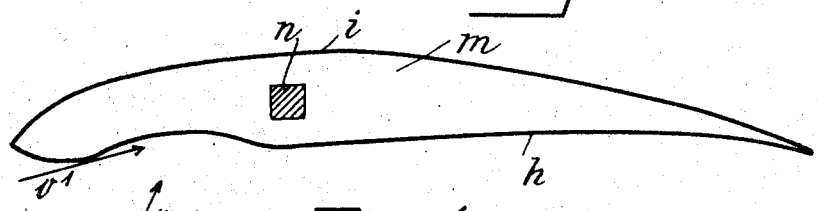
Fig. 5.
Fig. 4.
Inventors:
Povl Vinding and
Rasmus Johannes Jensen
By Attys.

Patented Sept. 11, 1923.

1,467,699

UNITED STATES PATENT OFFICE.

POVL VINDING AND RASMUS JOHANNES JENSEN, OF COPENHAGEN, DENMARK.

WING FOR WINDMILLS AND WIND MOTORS.

Application filed June 25, 1919. Serial No. 306,688.

*To all whom it may concern:*

Be it known that we, POVL VINDING and RASMUS JOHANNES JENSEN, subjects of the King of Denmark, residing at Copenhagen, Denmark, have invented new and useful Improvements in Wings for Windmills and Wind Motors, of which the following is a specification The invention is an improvement in wings for windmills and wind-motors, and it has for its object to give the resultant pressure, at any point of the wing-surface, such a direction relatively to the direction of the resultant wind-velocity that the maximum-possible impression of power per surface unit of the active surfaces of the wings is attained.

According to the present invention, this is attained by the surface of the wings (the windward as well as the lee portion of the wing-surfaces) being given such a shape that the air-streams coming into contact with the wings during the motion of the wings strike the wing-surface without shock and leave it without injurious suctions and eddy-formations whereby these injurious effects, which both tend to give the resulting pressure and unfavourable direction, are avoided.

Only recently it has been clearly ascertained that the resultant pressure is not perpendicular to the wing-surface, but forms a slight angle with a normal to that surface.

On the drawing—

Figs. 1 to 2 show two diagrams illustrating the character of the invention, and

Figs. 3 to 5 three forms of cross-section for a millwing.

It is known that a wing-surface moving at a speed being $n$ times the velocity of the wind will collect, from the wind, a work $A$ per surface unit of the active wing-area, which may be expressed by the formula:

$$A = (1 + m^2) n \frac{p}{\cos \alpha} \sin \beta,$$

where $p$ is the normal pressure per surface unit for a wind-velocity of 1 $m$, and $\alpha$ the angle between the normal to the surface and the resultant pressure $t$, while $\beta$ is the angle between the same resultant and the normal to the plane of motion of the wings (the axis of revolution).

The resultant pressure $t$ is equal to $p$: $\cos \alpha$.

Considering now a plane wing-surface $a$ (Fig. 1) for which the angle of entry $\varphi$ for the resultant wind velocity $v^1$, that is for the resultant of the absolute wind-velocity $v$, and a velocity $v^2$, which is equal to and oppositely directed to the wing-velocity, is about 12° (corresponding to $n=2.4$), then the angle $\alpha$ will be about 3° 50′. If the obliquity of the wing-surface, i. e. its inclination against the plane of movement $p$ of the wing, is for instance 10°, the angle $\beta$ will be 6° 10′.

The resultant pressure $t$ comes here between the normal $b$ to the plane of motion of the wings, which is paralled to the axis of revolution of the wings, and the normal $c$ to the wing-surface, which feature is extremely unfavourable because, as it appears from the expression for the energy collected per surface unit of the wing-surface, it is necessary to make the angle $\beta$ as large as possible, in order that the largest possible amount of energy may be impressed.

In the so-called "broken" wings $d$ (Fig. 2), the angle $\alpha$ between the resultant pressure $t$ and the normal $c$ to the wing-surface will be considerably smaller and, thereby, the angle $\beta$ larger. By suitable selection of the break in the wing-profile, the esult has even been attained that $\alpha$ became negative, equalling about 0° 25′ or, in other words, the resultant pressure $t$ comes between the normal $c$ to the wing-surface and the normal $e$ to the resultant wind-velocity $v'$, and forms an angle of 0° 25′ with the first mentioned normal.

If the obliquity of the wings is for instance 10°, the angle $\beta$ will consequently be 10° 25′, or much larger than in case of the plane wing-surface.

While the variation of the angle $\alpha$ has only a relatively slight influence on the value of A in the expression $$A = (1 + n^2) n \frac{p}{\cos \alpha} \sin \beta,$$

the variation of the angle $\beta$ on the contrary, has a considerable influence on the amount of energy impressed per surface unit. For this reason, the energy which may be impressed per surface unit of a broken or curved wing will be fully twice as large as the energy which may be impressed per surface unit of a plane wing, the wind velocity being the same and all other conditions alike.

In order to increase the energy impressed per surface unit, the aim should be, as mentioned above, to make the angle $\beta$ as large as possible which result may be attained by causing the direction of the resultant pressure to coincide, as nearly as possible, with the normal to the resultant wind-velocity at the point considered of the wing surface.

To increase the energy impressed by increasing largely the quantity $n$, that is to say by making the wing-velocity very large in comparison with the wind-velocity, would involve the drawback that the resistance against the motion of the wings would be largely increased, and in this respect especially the injurious effects (suctions at the edge where the wind leaves the wing) appearing in case of the heretofore used wing-constructions will tend to decrease the useful energy or, in other words, to give the resultant pressure $t$ an unfavorable direction.

To increase $n$ beyond a certain limit will thus create unfavorable conditions, as a limit will soon be reached, where the useful energy disappears entirely.

It has been demonstrated that the angle $\beta$ and, thereby, the amount of energy collected per surface unit may be increased by letting the outlines of the cross-section of the wing follow the stream-lines produced by the front edge of the wings cleaving the uniformly directed air-stream (the wind).

In order to attain this, the wing is made curved, that is to say it is given, in principle, the shape of a broken wing, the front edge being thickened and rounded, however, while the rear edge of the wing is sharpened, in other words is made as sharp-edged as possible. The wing will thereby not be plate-shaped as heretofore, but will be shaped as a curved body of oblong cross-section pointed at the end, but rounded at front or ending there in a blunt point, as shown in Figs. 3 and 4.

The cross-sectional shape of the wings is determined in that the angle of entry, which depends on the ratio $n$ and on the obliquity of the wings, is adjusted in such a manner that the point where the air-stream (the wind) is cleaved by striking the wing becomes located on the front face of the wings and, in the direction of motion, behind the front edge of the wing, and in that the air-streams $r$ (Fig. 3) formed by the cleavage and following the rear face of the wing glide along the latter to the rear edge of the wing, and leaves this edge without producing any suction effects or eddy-motions, while the air-streams $l$ passing along the front face of the wing strike the latter without any shock and, maybe, in that the front portion of the wing is shaped (Fig. 4) in such a manner that there may be produced, thereby, a suction-effect acting in the direction of the tangent of entry, which suction-effect will assist in turning the resultant pressure into a favourable direction.

According to the present invention, a cross-section of a wing may also be composed of two or more cross-sections of the shape shown in Fig. 3 or 4, for instance, as shown in Fig. 5, of two segments $f$ and $g$, having each a cross-section of the shape shown in Fig. 3.

In case of the last mentioned construction, the angle $\alpha$ may be considerably larger than for the heretofore used wing-constructions, for instance by a wing-obliquity of 10° there may be obtained an angle $\alpha$ of 5 to 6°, whereby the angle $\beta$ would become 15 to 16°. For a wing-shape of this nature, the energy impressed per surface unit may be several times as large as for the plane and the broken wing, other conditions being alike.

In Figs. 3 and 4, $h$ is the surface facing the direction $v$ of the wind, and $i$ is the lee surface of wing, which is moving in the direction indicated by the arrow $k$ (Fig. 3). These surfaces may either be the two surfaces of a solid body, as indicated in Fig. 3, of one of the cross-sectional shapes shown in Fig. 3 or 4, or they may be plates fastened on a skelton composed of frames $m$ (Fig. 4) of the shape shown and a wing-stem or wing-beam $n$ enclosed by the plates $i$ and $h$, so that it does not present any surface offering resistance against the motion of the wing.

Having now particularly described and ascertained the nature of our said invention and in what manner the same is to be performed, we declare that what we claim is:—

1. A wind-motor wing having a cross-section with a relatively thick leading-portion terminating, at front, in a blunt edge and tapering into a sharp edge towards the rear, the said cross-section being shaped in accordance with the stream-lines of the air passing the wing.

2. A wind-motor wing having a cross-section with a relatively thick leading-portion terminating, at front, in a blunt edge and tapering into a sharp edge towards the rear, the said cross-section being shaped in accordance with the stream-lines of the air passing the wing, and a wing beam enclosed within the surfaces of the wing.

In witness whereof, we have hereunto signed our names in the presence of two subscribing witnesses.

POVL VINDING,
RASMUS JOHANNES JENSEN.

Witnesses:
CARL MENNINGSEN,
ULLA BANG.